(12) United States Patent
Crill

(10) Patent No.: US 7,374,371 B2
(45) Date of Patent: May 20, 2008

(54) PROCESS AND COMPOSITION FOR FORMING AN EARTHEN HARDPAN

(76) Inventor: Dick Crill, 8860 Road Runner Path, Snyder, TX (US) 79549

( * ) Notice: Subject to any disclaimer, the term of this patent is extended or adjusted under 35 U.S.C. 154(b) by 349 days.

(21) Appl. No.: 11/181,883

(22) Filed: Jul. 15, 2005

(65) Prior Publication Data

US 2007/0014639 A1    Jan. 18, 2007

(51) Int. Cl.
*C09K 17/00* (2006.01)
*E02D 3/12* (2006.01)

(52) U.S. Cl. ................................ 405/270; 405/263

(58) Field of Classification Search ............. 405/263, 405/266, 270, 271
See application file for complete search history.

(56) References Cited

U.S. PATENT DOCUMENTS

| | | | | |
|---|---|---|---|---|
| 2,277,286 A | * | 3/1942 | Bechtner | .......... 405/107 |
| 3,949,560 A | * | 4/1976 | Clem | .......... 405/264 |
| 4,222,685 A | | 9/1980 | Jefferson et al. | |
| 4,393,939 A | * | 7/1983 | Smith et al. | .......... 166/293 |
| 4,647,259 A | | 3/1987 | Magaritz et al. | |
| 4,674,574 A | * | 6/1987 | Savoly et al. | .......... 166/293 |
| 5,476,142 A | * | 12/1995 | Kajita | .......... 166/294 |
| 6,558,081 B2 | * | 5/2003 | Hull | .......... 405/157 |

* cited by examiner

*Primary Examiner*—Tara L. Mayo
(74) *Attorney, Agent, or Firm*—Jacobson Holman PLLC

(57) ABSTRACT

A brine sealant solution and both a one-step and two-step process for producing an earthen hardpan in a pond or slush pit is described. The process disperses clay in an aqueous solution using monovalent and divalent cations and bentonite clay. The dispersed clay is then used to fill the seepage capillaries. A second aqueous solution of monovalent and divalent cations and a wetting agent is applied and aggregates the clay and creates a hardpan.

7 Claims, No Drawings

PROCESS AND COMPOSITION FOR FORMING AN EARTHEN HARDPAN

BACKGROUND OF THE INVENTION

1. Field of Invention

The present invention relates generally to methods and compositions creating an earthen hardpan and more specifically to an earthen hardpan useful for sealing ponds, and/or drilling pits.

2. Description of Prior Art

There currently are two main systems for the sealing of ponds. The first system makes use of natural materials, such as clay minerals or more specifically Na-bentonite, or soils rich in clay, salts or polymers (Prickett, 1968, FAO; Wilson, K. J., 1966, Am. Soc. of Civil Eng. Denver; Banin, A., 1976, Fac. Agri. Heb. Univ. Jerusalem; Garbotz, G., 1966. Con. Jour.).

The second system is based on the use of artificial coverings of ponds, for example asphalt, plastic films made of polyethylene, P.V.C., synthetic rubber and the like.

The first system has historically suffered from seepage of water, reaching several percentages of water loss per volume. In cases in which sewage water is restored there exists the danger that such water will reach the aquifer and contaminate it. The artificial materials used for sealing are more reliable but are much more expensive than the natural ones.

In many studies, the combination of soil material and clay with the addition of Na salts, was found to minimize the hydraulic conductivity of porous media. However, the exact percentages of clay and sand were not specified. Absolute saturation of the clay by Na was never attained, nor obviously the absolute sealing of the soil, and its application for water reservoirs.

More recently, a method of sealing ponds was described in U.S. Pat. No. 4,647,259, where the water impervious layers are produced from mixtures of sand (about 90 to 98.5 weight percent) and montmorillonite ((Na, Ca) (Al, Mg)6 $(Si_4O_{10})_3$ $(OH)_6$—$nH_2O$, hydrated sodium calcium aluminum magnesium silicate hydroxide) (about 1.5 to 10 weight percent), which are compacted and contacted with salt water having a salt content at least equal to that of sea water, and the layers are then washed until no further Na comes off the layers.

To form a hardpan or water barrier in a soil requires clay and multivalent cations such as calcium and magnesium. These cations, when in solution with the clay particles, form chelates and aggregate. The aggregate form a water impermeable layer when sufficiently dense. Perched water tables form over these hardpans. How quickly a hardpan forms depends an the clay content and the cation content.

Bentonite clay has been successfully used as a pond sealant for many years. Dry ponds have been lined with bentonite clay as standard procedure when leaks cannot be tolerated. When fresh water is added to bentonite clay it will expand to 18 times its normal volume in the dry state. However, in arid climates, the water eventually evaporates from the bentonite causing it to dry and crack and create new fissures for leakage to occur when liquid is reintroduced to the pond or well site.

Until the present invention, there has not been available a method for sealing ponds using bentonite or other clays in combination with monovalent and divalent cations that will not dry and crack in a low moisture environment.

SUMMARY OF THE INVENTION

In accordance with the present invention, it has now been found that adding a specific deliquescent brine solution to the bentonite clays causes smaller volume expansion. The first step in the hardpan formation process of the present invention, is to form a dispersion of clay particles with a mixtures monovalent and divalent cations in a deliquescent brine solution. These cations include sodium, potassium, magnesium and calcium and similar ions. The deliquescent brine solution has a density greater than water, and a sufficient monovalent and divalent cation concentration to allow the clay molecules to separate into individual molecules and disperse into solution.

The solution of dispersed clay molecules thus formed has the beneficial property of being able to flow down the seepage capillaries in the basin of the pond and eventually physically fill the spaces of the capillaries, plugging them. The dispersed clay molecules then separate into very fine particles and form a suspension. These particles plug up percolation openings in the soil.

The second step in the process of the present invention is formation of the hardpan. The hardpan is formed with the same deliquescent salt composition as in the first step, except a wetting agent is added. The hardpan is completed when calcium or magnesium hydrates, in the deliquescent brine solution, form aggregates with the clay particles which then form over the top of the plugged up openings creating a water barrier.

It is therefore an object of the present invention to provide a method of sealing ponds or other earthen surfaces using a mixture of bentonite clay and a specific deliquescent brine solution.

It is also an object of the present invention to provide a method where bentonite clays are mixed with a brine solution and a wetting agent and applied to the surface for sealing the surface.

It is a further object of the present invention to provide a composition and process for sealing a pond containing water.

These and other objects of the invention, as well as many of the attendant advantages thereof, will become more readily apparent when reference is made to the following detailed description of the preferred embodiments.

DETAILED DESCRIPTION AND PREFERRED EMBODIMENTS

In describing a preferred embodiment of the invention specific terminology will be resorted to for the sake of clarity. However, the invention is not intended to be limited to the specific terms so selected, and it is to be understood that each specific term includes all technical equivalents which operate in a similar manner to accomplish a similar purpose.

Bentonite clay and other clays comprise mixtures of iron silicates. These silicates are negatively charged in solution. It is known that when positively charged monovalent ions are added to a suspension of clays, such as the addition of Na+ or K+, the positive charged ions counter the negatively charged clays allowing the molecules of clay to become more water soluble and disperse into solution. The dispersed clay in concentrated brine water allows the clay molecules to separate into individual molecules.

Having the clay molecules dissolved in a high density brine solution allows these dispersed and suspended clay molecules to be pulled down by gravity and flow into and down the seepage capillaries in the pond bottom. While not wanting to be bound by a specific technical theory, it is thought that in the capillary, the aqueous solution of mono and divalent ions can pass through, whereas the large dispersed clay molecules eventually become physically stuck in the capillary and over time, the clay molecules plug up the capillaries. It has been found by the inventor that stacking or laying the bentonite clay over the top of the earthen capillaries at the bottom of ponds or pits, is less effective than targeted solutions of dispersed clay molecules that plug the capillaries.

It has also been surprisingly found that the use of brine solutions having a mixture of monovalent and divalent cations with bentonite that are deliquescent can achieve permanent sealing of seepage capillaries. Normally, pits or ponds treated with standard salt brines will dry out over time and crack open, which breaks the seal, and the pit or pond will not hold water.

An example of the composition of sealant used for creating an earthen hardpan of the present invention is presented in Table 1. The percentages of salts are by weight with the remainder being water.

TABLE 1

| Mineral Content | Percentage by weight |
| --- | --- |
| Chloride | 22.27 |
| Bromide | 0.45 |
| Magnesium | 3.94 |
| Calcium | 0.76 |
| Sodium | 6.38 |
| Potassium | 0.30 |
| Manganese | 0.02 |
| Total salts | 34.12 |
| Water | 65.88 |

The density of the sealant solution is typically between about 10 to about 11 pounds per gallon of solution, preferably between about 10.1 to about 10.2 pounds per gallon of solution, and most preferably about 10.18 pounds per gallon of solution.

The composition of brine sealant is preferably a mixture of magnesium and calcium chloride in a ratio of about 5 to 1 magnesium chloride to calcium chloride. The composition also must have sufficient sodium chloride or potassium chloride to suspend the clay and disperse it in solution. Most importantly, the brine solution must be deliquescent. That is, the composition will draw moisture out of the air continuously until it attains a liquid state. Examples of deliquescent salts are ammonium sulphate, calcium chloride, magnesium chloride, potassium carbonate, trichloroacetic acid, calcium phosphate, nickel(II) chloride, ferric sulfate, potassium hydroxide, calcium nitrate, and sodium cyanide. When deliquescent salts are used, the hardpan seal will not dry out or crack causing new seepage to take place. It has been found that with air temperatures over 100° F. and less than 2-3% humidity, magnesium chloride is the deliquescent salt which is most preferred.

When wetting agents are used in the present invention as a part of the soil penetrating composition, they can be selected from a variety of anionic, cationic or nonionic detergents. Preferably, the wetting agent is selected from the class of agents known as phosphated alcohols, or phosphated polyoxyethylenated alcohols such as Victawet® 12 or Victawet® 35B, from Structure Probe, Inc. (West Chester, Pa.). The concentration of wetting agent is very small compared to the other constituents. In use, the amount of wetting agent added to the brine solution is in the range of 0.00001% to 0.001% by weight. Preferably, the amount is about 0.0001% by weight.

When a pond or pit is sealed using the process and composition of the present invention, and then de-watered when closing the pit, the sealant and resulting hard pan are left intact in the bottom of the pond or pit. It is important therefor to only to use the amount of bentonite clay necessary to form a sub-surface sealant that will form an earthen hardpan.

Slush pits can also be sealed with the process and composition of the present invention and then de-watered when the pit is closed. The sealed hardpan is left intact at the bottom of the pit. When the pit is filled in and covered over, the hard pan sealant prevents pit seepage from percolating on down and potentially contaminating ground water.

In another embodiment of the present invention, ponds or pits can be sealed by using a two step process where the first step comprises using sealing solution that contains only monovalent cations such as sodium or potassium, to disperse the clay. In the second step, a brine sealing solution such as the one described in Table 1, having both monovalent and divalent cations, is then added to create the hardpan. The sealing solution of the second step may also include a wetting agent.

EXAMPLE 1

Sealing a Dry Pond

When applying the sealant of the present invention to an empty dry pond a two-step process is used. First, a liquid spray application is applied to the bed of the pond using the sealant composition of bentonite clay and the sealant brine mixture described in Table 1. The amount of bentonite clay per gallon of brine can range from about 0.25 to about 2 pounds of clay per gallon. Preferably, the amount of clay is about 1 pound of clay per gallon of brine solution. The dispersed clay particles in the sealant composition will enter the seepage capillaries of the pond and block the seepage of water through the capillaries.

The second step in the process is application of a soil penetrating composition comprising the brine solution of Table 1 and a wetting agent. This second solution binds the clay particles in place and forms an earthen hardpan barrier that stops the seepage from the pond or pit. The wetting agent can be any known agents useful for lowering the surface tension of water. Preferably, the wetting agents are from the class of known surfactants or detergents. Most preferably, the wetting agent should be a degreaser so that it can prevent hydrocarbons and other organic matter from intercalating between the calcium and magnesium cations and the clay particles, breaking up the hardpan. Most soils have some clay, and some have a high clay content. The second solution causes the added bentonite clay to swell along with what other clay resides in the soil, and then binds the clay particles in the seepage capillaries.

When sealing a dry pond using this two-step process, each solution is preferably applied at the rate of between about 0.25 to 2 gallons per square yard. More preferably about 0.5 gallons per square yard, depending on the application.

EXAMPLE 2

Sealing a Filled Pond

When a pond or pit already contains water in it, a one step process is used. A sealing composition of bentonite clay and the brine solution of Table 1 is flowed into the pond, preferably, it is flowed into the pond at several points around the edge of the pond where seepage is occurring. More bentonite clay is required when the seepage capillaries are already filled with water.

When sealing a pond with water in it, soil stabilizing solutions are not effective. Only the first solution with dispersed bentonite clay is used. The amount of solution that is applied is at least about twice the amount used in a dry pond application. Preferably the rate of application is about 1 gallon per square yard of pond surface. It is understood that the deeper the water in the pond or pit, the more difficult it will be to stop the seepage. Repeated applications or increasing concentrations of clay in the brine solution may be needed. Pits that contain bottoms having mostly rock may not ultimately be sealable.

Having described the invention, many modifications thereto will become apparent to those skilled in the art to which it pertains without deviation from the spirit of the invention as defined by the scope of the appended claims.

The invention claimed is:

1. A brine sealant solution useful in generating an earthen hardpan comprising:
   a) a deliquescent aqueous solution of salts of monovalent and divalent cations wherein the monovalent cation salts are selected from the group consisting of sodium chloride and potassium chloride, and wherein the divalent cation salts consist of magnesium chloride and calcium chloride;
   b) bentonite clay in a sufficient amount such that when said composition is mixed with the deliquescent aqueous solution of a) above, the clay particles disperse and are capable of entering into and filling seepage capillaries in an earthen space to be sealed;
   c) the ratio by weight of magnesium chloride to calcium chloride is about 5 to 1;
   d) the percentage by weight of sodium chloride or potassium chloride is sufficient to suspend and disperse the bentonite clay in the solution; and
   e) the density of the final solution is between 10 to 11 pounds per gallon of solution.

2. The brine sealant solution of claim 1, wherein the deliquescent mixture of salts comprises sodium chloride and magnesium chloride.

3. The brine sealant solution of claim 1, having the following mineral composition by weight percent: chloride, 22.27; bromide, 0.45; magnesium, 3.94; calcium, 0.76; sodium, 6.38; potassium, 0.30; manganese, 0.02; between about 0.5 to about 2.5 lb of bentonite per gallon of solution.

4. A process for creating an earthen hardpan in a dry space comprising the steps of:
   a) applying a sufficient quantity of the brine sealant solution of claim 1 so that the seepage capillaries are filled with dispersed clay particles; and
   b) applying a sufficient quantity of a soil penetrating solution comprising a deliguescent mixture of salts of monovalent and divalent cations having the following mineral composition by weight percent: chloride, 22.27; bromide, 0.45; magnesium, 3.94; calcium, 0.76; sodium, 6.38; potassium, 0.30; manganese, 0.02; a wetting agent at a concentration of about 0.0001 weight percent per gallon of solution, and water, such that the clay in the seepage capillaries is bonded together and the earthen surface forms a hardpan.

5. A process for creating an earthen hardpan in a space covered by water comprising the steps of:
   a) admixing additional clay to a sufficient quantity of the brine sealant solution of claim 1; and
   b) feeding the brine sealant solution around the edges of water covered space where the seepage occurs so that the seepage capillaries are filled with dispersed clay particles and are plugged.

6. A soil penetrating solution useful for creating an earthen hardpan comprising:
   a) a deliquescent mixture of salts of monovalent and divalent cations having the following mineral composition by weight percent: chloride, 22.27; bromide, 0.45; magnesium, 3.94; calcium, 0.76; sodium, 6.38; potassium, 0.30; and manganese, 0.02;
   b) wetting agent at a concentration of about 0.0001 weight percent per gallon of solution; and
   c) water.

7. A process for creating an earthen hardpan in a soil comprising the steps of:
   a) dispersing clays present in the soil using a first solution comprising a deliquescent aqueous solution of salts of monovalent and divalent cations wherein the monovalent cation salts are selected from the group consisting of sodium chloride and potassium chloride, and wherein the divalent cation salts consist of magnesium chloride and calcium chloride, and bentonite clay is added in a sufficient amount such that when said composition is mixed with the deliguescent aqueous solution, and wherein the ratio by weight of magnesium chloride to calcium chloride in said solution is about 5 to 1, and the percentage by weight of sodium chloride or potassium chloride in said solution is sufficient to suspend and disperse the bentonite clay in the solution, and wherein the density of the final solution is between 10 to 11 pounds per gallon of solution; and
   b) introducing a second solution comprising comprising a deliquescent mixture of salts of monovalent and divalent cations having the following mineral composition by weight percent: chloride, 22.27; bromide, 0.45; magnesium, 3.94; calcium, 0.76; sodium, 6.38; potassium, 0.30; manganese, 0.02; a wetting agent at a concentration of about 0.0001 weight percent per gallon of solution, and water, in a quantity sufficient to aggregate the clay and form a hardpan.

* * * * *